(12) United States Patent
De Wergifosse et al.

(10) Patent No.: US 10,090,733 B2
(45) Date of Patent: Oct. 2, 2018

(54) ELECTRICAL POWER SUPPLY FOR EQUIPMENT CARRIED BY A ROTARY SUPPORT

(75) Inventors: Eric De Wergifosse, Saint Augustin (FR); Cedric Duval, Samois sur Seine (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 1164 days.

(21) Appl. No.: 13/808,015

(22) PCT Filed: Jun. 29, 2011

(86) PCT No.: PCT/FR2011/051514
§ 371 (c)(1),
(2), (4) Date: Jan. 2, 2013

(87) PCT Pub. No.: WO2012/001302
PCT Pub. Date: Jan. 5, 2012

(65) Prior Publication Data
US 2013/0101397 A1    Apr. 25, 2013

(30) Foreign Application Priority Data
Jul. 2, 2010    (FR) ..................................... 10 55383

(51) Int. Cl.
*H02K 7/18*    (2006.01)
*B64D 15/12*    (2006.01)
(Continued)

(52) U.S. Cl.
CPC .......... *H02K 7/1823* (2013.01); *B64D 15/00* (2013.01); *B64D 15/12* (2013.01); *H02P 9/46* (2013.01);
(Continued)

(58) Field of Classification Search
None
See application file for complete search history.

(56) References Cited

U.S. PATENT DOCUMENTS 2,446,663 A * 8/1948 Palmatier ............... B64D 15/02
123/41.65
4,242,628 A * 12/1980 Mohan .................. F03D 7/0272
290/44

(Continued)

FOREIGN PATENT DOCUMENTS

| EP | 0 099 803 | 2/1984 |
|----|-----------|--------|
| EP | 1 953 085 | 8/2008 |
| FR | 2 568 428 | 1/1986 |

OTHER PUBLICATIONS

International Search Report dated Oct. 26, 2012 in PCT/FR11/51514 Filed Jun. 29, 2011.

*Primary Examiner* — Ninh H Nguyen
*Assistant Examiner* — Jason Davis
(74) *Attorney, Agent, or Firm* — Oblon, McClelland, Maier & Neustadt, L.L.P.

(57) ABSTRACT

An apparatus including a fixed part, a rotary support configured to be driven in rotation relative to the fixed part, at least one item of electrical equipment carried by the rotary support, and a power supply device configured to supply electrical energy to the electrical equipment. The power supply device includes an asynchronous machine including a stator fixed to the fixed part and a rotor carried by the rotary support, and an excitation device. The stator includes an electrical circuit including at least one switch configured to switch between an open state in which the electrical circuit is open and a closed state in which the electrical circuit is closed. The rotor includes at least one winding connected to the electrical equipment. The excitation device (Continued)

is configured to provide a reactive current to the electrical circuit of the stator or to the winding of the rotor.

17 Claims, 3 Drawing Sheets

(51) Int. Cl.
*H02P 9/46* (2006.01)
*H01F 38/18* (2006.01)
*H02P 101/30* (2015.01)
*B64D 15/00* (2006.01)
*B64D 27/02* (2006.01)

(52) U.S. Cl.
CPC ........ *B64D 2027/026* (2013.01); *H01F 38/18* (2013.01); *H02P 2101/30* (2015.01)

(56) References Cited

U.S. PATENT DOCUMENTS

| | | | |
|---|---|---|---|
| 4,532,465 A | 7/1985 | Renard | |
| 5,587,643 A * | 12/1996 | Heller | H02P 9/46 318/821 |
| 5,986,438 A | 11/1999 | Wallace et al. | |
| 7,936,082 B2 * | 5/2011 | Boudyaf | B64D 15/12 219/202 |
| 2007/0084186 A1 * | 4/2007 | Orlando | F02C 3/107 60/204 |
| 2007/0257153 A1 * | 11/2007 | Froman | B64C 29/0033 244/134 D |
| 2010/0207479 A1 * | 8/2010 | Madawala | H02K 17/42 310/166 |
| 2010/0283319 A1 | 11/2010 | Boudyaf et al. | |

* cited by examiner

ELECTRICAL POWER SUPPLY FOR EQUIPMENT CARRIED BY A ROTARY SUPPORT

BACKGROUND OF THE INVENTION

The invention concerns the supply of electrical energy to electrical equipment carried by a rotary support. In particular, the invention relates to the supply of electrical energy to electrical equipment carried by a rotor of an aircraft engine.

It is known to equip the blades carried by a rotor of an aircraft engine with a de-icing device, comprising heating resistances intended to prevent the formation of ice. To supply power to said de-icing device, electrical energy must be transmitted towards the rotor.

For this purpose, typically a brush device is used. However, brush devices are generally little reliable and subject to rapid wear. They therefore require regular maintenance. In addition, they are generally heavy and cumbersome and may give rise to problems of compatibility with surrounding oils.

It is also known to transmit electrical energy towards the rotor via a rotating transformer. When the power to be transmitted is high, a rotating transformer is generally a heavy, cumbersome device. In addition, it must be supplied by a source whose power corresponds to the power required by the rotor. A power converter and an energy source sized to deliver high power are therefore necessary.

Additionally, it is known that an asynchronous machine is able to function as a self-excited asynchronous generator. An asynchronous machine typically comprises a rotor comprising a closed electrical circuit (squirrel-cage rotor or windings connected in closed circuit) and a stator comprising at least one winding able to be connected to a load. To allow functioning as a self-excited asynchronous generator, a capacitor bank intended to supply reactive power is connected to the asynchronous machine.

When the rotor is driven in rotation, and if the capacity value of the capacitor bank is suitably chosen in relation to the load and speed of rotation, said asynchronous machine is able to function as a generator and to supply electrical energy to the stator load.

SUBJECT AND SUMMARY OF THE INVENTION

The invention sets out to provide apparatus in which electrical equipment carried by a rotary support must be supplied with power, and which does not have at least some of the disadvantages of the aforementioned prior art. In particular, it is one objective of the invention to allow the transmission of electrical energy towards electrical equipment in reliable manner and without necessitating a heavy, cumbersome device.

For this purpose, the invention proposes apparatus comprising a fixed part, a rotary support able to be driven in rotation relative to said fixed part, at least one item of electrical equipment carried by said rotary support, and a power supply device capable of supplying electrical energy to said item of electrical equipment,
characterized in that
said power supply device comprises an asynchronous machine comprising a stator fixed to said fixed part and a rotor carried by said rotary support, and an excitation device,
said stator having an electrical circuit including at least one switch capable of switching between an open position in which said electrical circuit is open and a closed state in which said electrical circuit is closed,
said rotor comprising at least on winding connected to said electrical equipment,
said excitation device being able to supply a reactive current to said electrical circuit of the stator or to said winding of the rotor.

When the switch is in its closed state, the electrical circuit of the stator is closed. If the rotary support, and hence the rotor of the asynchronous machine, are driven in rotation, the asynchronous machine is then able to function as a self-excited asynchronous generator and to generate electrical energy in the winding of the rotor. In other words, the invention proposes using, as device supplying power to an item of electric equipment carried by a rotary support, an asynchronous machine configured to function as a self-excited asynchronous generator in which the roles of stator and rotor are reversed relative to the self-excited asynchronous generator cited in the introduction hereto. It is therefore possible to generate electrical energy that is available at the rotary support, allowing power to be supplied to the electrical equipment carried by the rotary support, without requiring a brush device or rotating transformer. In addition, the electric power consumed by the electrical equipment is entirely taken from the rotary support. It is not necessary to supply electric power to the stator of the asynchronous machine in order to generate electric power towards the rotary support.

The excitation device may comprise a capacitor.

Said capacitor allows self-excitation of the asynchronous machine when the speed of rotation of the rotary support and the load of the electrical equipment are substantially constant. In this case, the apparatus may use a capacitor of constant capacity as excitation device, and hence be of simple structure.

The excitation device may comprise a capacitor bank having variable capacity, or an electronic device capable of supplying a commanded reactive current.

This makes it possible to cause the asynchronous machine to operate as a self-excited asynchronous generator when the rotation speed and/or the load vary.

According to one embodiment, the excitation device is connected to said electrical circuit of the stator.

The apparatus may comprise an electronic command unit capable of commanding the switching of said switch and of estimating a current circulating in said electrical equipment as a function of a measurement signal representing a current circulating in said electrical circuit. The electronic command unit may be supplied by a device capable of taking power from the stator of the asynchronous machine.

This makes it possible to prevent the excitation device, the switch and diagnosis devices from undergoing stresses related to the high temperature which may prevail at the rotary support and mechanical stresses related to centrifugal acceleration.

According to one variant, the apparatus comprises a device to assist priming capable of causing a current to circulate in said electrical circuit when the switch is in closed state.

The apparatus may be any type of apparatus comprising a fixed part and a rotary support carrying an item of electric equipment to be powered, for example an aircraft engine in which electrical equipment is to receive power from the rotor of the engine. Therefore, the invention further concerns an aircraft engine also comprising a main shaft, a second rotary support and a power gear box capable of converting rotation of the main shaft to rotation of a rotary support in a first direction and to rotation of the second rotary support in a second direction opposite said first direction.

According to one embodiment said rotary support carries blades, the said electrical equipment comprising a de-icing device including resistances integrated in the blades.

The invention also relates to a method for supplying power to electrical equipment of an apparatus, comprising a fixed part, a rotary support capable of being driven in rotation relative to said fixed part, said electrical equipment being carried by said rotary support, and a power supply device capable of supplying electrical energy to said electrical equipment, characterized in that said power supply device comprises an asynchronous machine comprising a stator fixed to said fixed part and a rotor carried by said rotary support, and an excitation device, said stator having an electrical circuit including at least one switch capable of switching between an open state in which said electrical circuit is open and a closed state in which said electrical circuit is closed, said rotor comprising at least one winding connected to said electrical equipment, said excitation device being capable of supplying a reactive current to said electrical circuit of the stator to said winding of the rotor, said method comprising a step to cause the said asynchronous machine to function as a self-excited asynchronous generator.

BRIEF DESCRIPTION OF THE DRAWINGS

The invention will be better understood on reading the description given below by way of indication which is non-limiting and refers to the appended drawings in which.

DETAILED DESCRIPTION OF EMBODIMENTS

Figure 1:
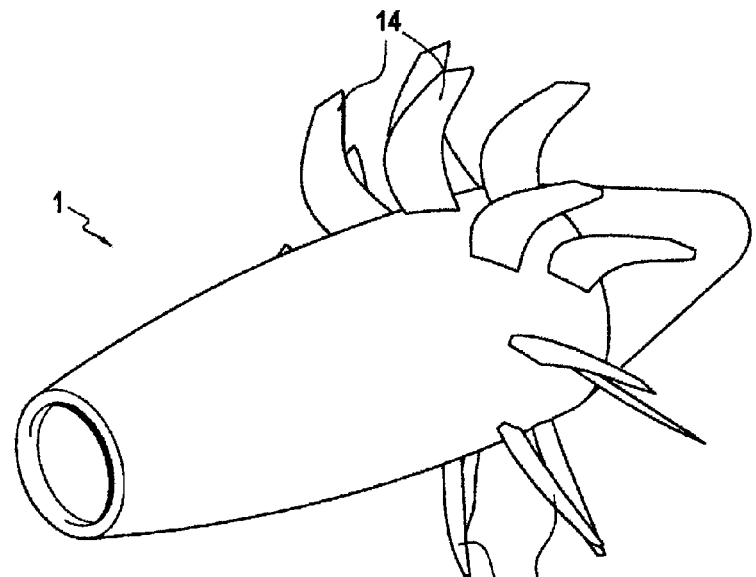
FIG. 1 is a perspective view of an aircraft engine according to one embodiment of the invention.

FIG. 1 gives a perspective view of an aircraft engine 1 illustrated very schematically. The engine 1 is an engine of non-ducted fan type having two counter-rotating rotary supports. Each rotary support carries blades 14. The view in FIG. 2 schematically illustrates the part of the engine 1 at the Power Gear Box allowing conversion of the rotation of a main shaft to rotation of the rotary supports in two opposite directions.

The engine 1 comprises a fixed part 2 and a main shaft 3 driven in rotation, for example a gas turbine. The engine 1 also comprises a rotary support 4 and a rotary support 5. Bearings 7 allow the rotation of the main shaft 3 and of the rotary supports 4 and 5 relative to the fixed part 2.

A Power Gear Box 6 connects the main shaft 3 to the rotary support 4 and the rotary support 5. More specifically, when the main shaft 3 rotates in a first direction, the Power Gear Box 6 drives the rotary support 5 in the same first direction and the rotary support 4 in a second opposite direction. The Power Gear Box 6 also reduces the speed of rotation. For example, for a typical rotation speed of the main shaft 3 of +6000 rpm, the rotary support 5 rotates at a speed of +900 rpm and the rotary support 4 rotates at a speed of −900 rpm.

Figure 2:
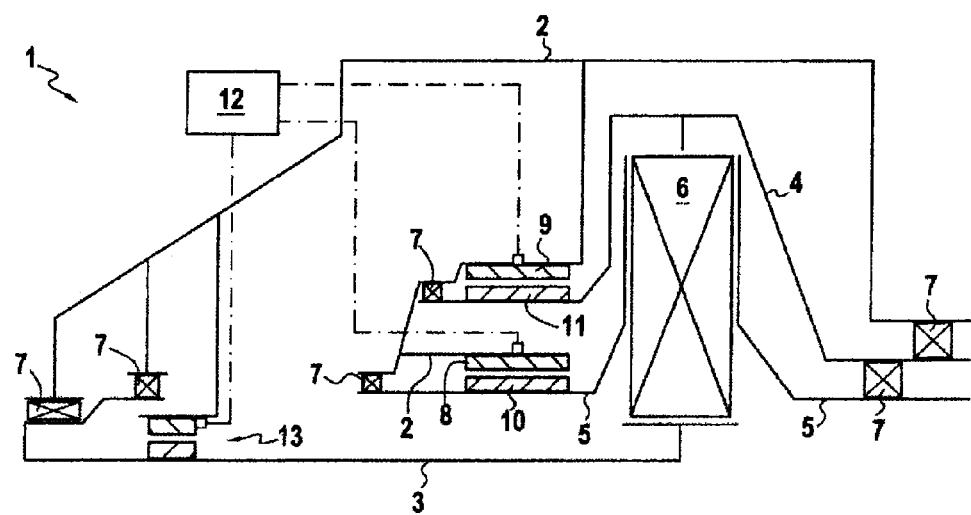
FIG. 2 is partial sectional view of the engine in FIG. 1.

The blades 14, carried by the rotary supports 4 and 5 are not illustrated in FIG. 2. Each of the rotary supports 4 and 5 carries a de-icing device (not illustrated) comprising electric resistances integrated in the blades 14.

The engine 1 also comprises a stator 8 and a stator 9 both fixed to the fixed part 2, and a rotor 10 carried by the rotary support 5 of the engine 1 and a rotor 11 carried by the rotary support 4 of the engine 1. The stator 8 and the rotor 10 form a first asynchronous machine supplying power to the de-icing device of the rotary support 5. The configuration and functioning of this asynchronous machine are described in detail below. The stator 9 and rotor 11 correspondingly form a second asynchronous machine supplying power to the de-icing device of the rotary support 4. The configuration and functioning of this asynchronous machine are substantially identical to those of the first machine and will therefore not be described in detail.

Finally, the engine 1 comprises an electronic command unit 12 and a generator 13 with a permanent magnet powering the electronic command unit 12, which allows autonomous operation. As a variant or in addition, the electronic command unit 12 could be powered from the network on board the aircraft for example. As a second variant, the electronic command unit 12 can be powered both by the on-board network of the aircraft and by a device 17 capable of taking power from the asynchronous machine. If the application so allows, it will then be possible to ensure autonomy of the function without adding any auxiliary generator 13. The device 17 is described in more detail below.

Figure 3:
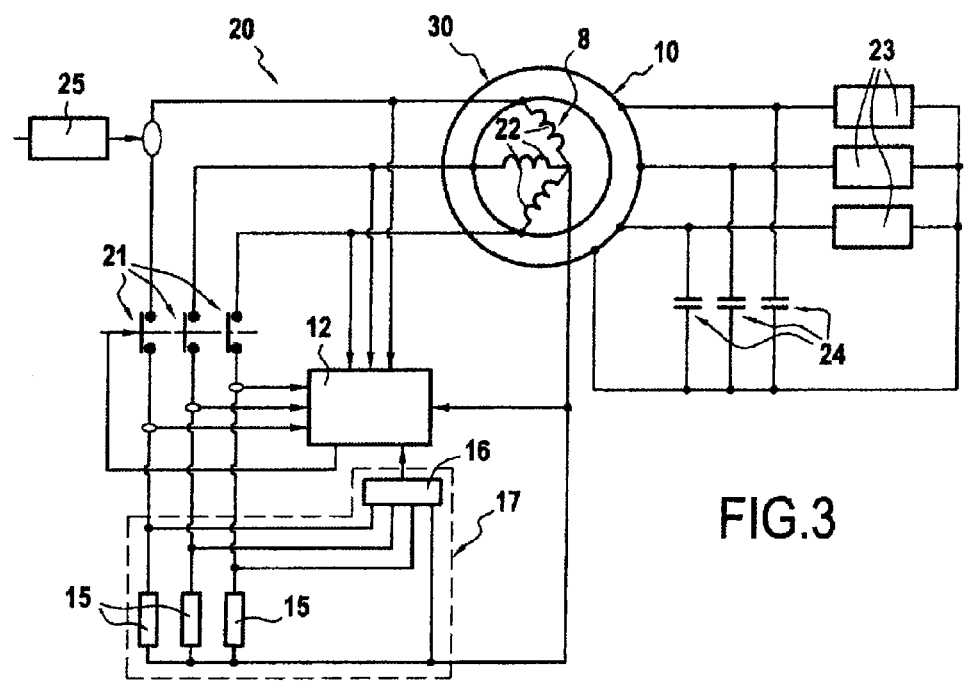
FIG. 3 is a schematic of a device supplying power to the engine in FIG. 1.

FIG. 3 schematically illustrates the manner in which power is supplied to the resistances 23 of the de-icing device of the rotary support 5. As explained in the foregoing, the asynchronous machine 30 is formed by the stator 8 and the rotor 10.

The stator 8 comprises an electrical circuit 20 comprising windings 22 and switches 21. In the illustrated example, the electrical circuit 20 is a three-phase circuit. As a variant, it could be a single-phase or poly-phase circuit. Also as a variant, the windings 22 could be replaced by bars.

When the switches 21 are in their closed state, the electrical circuit 20 is a closed circuit and when the switches 21 are in their open state the electrical circuit 20 is an open circuit.

The electronic command unit 12 receives measurement signals representing currents circulating in the electrical circuit 20. Also, the electronic command unit 12 may command the opening or closing of the switches 21.

The rotor 10 of the asynchronous machine 30 comprises windings (not illustrated) connected to the resistances 23. In the illustrated example, the electrical circuit of the rotor 10 is a three-phase circuit. As a variant, it could be a single-phase of poly-phase circuit.

Self-excitation capacitors 24 are connected to the rotor 10.

Figure 4:
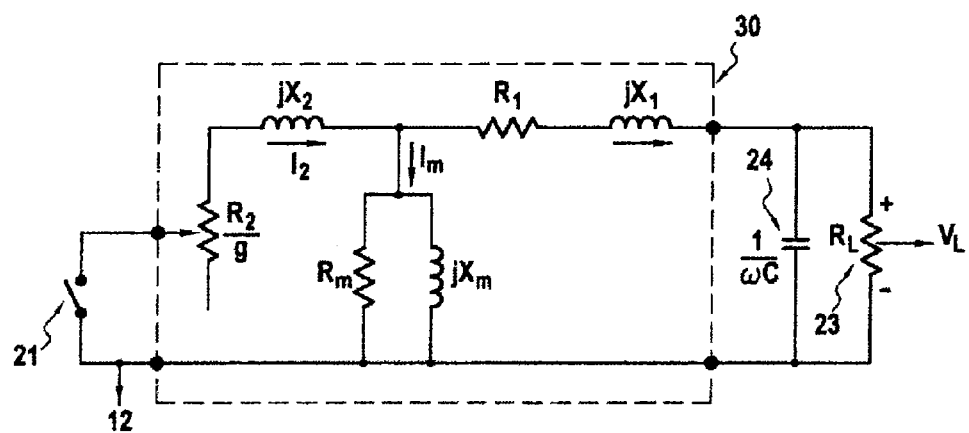
FIG. 4 is an equivalent electric diagram for one phase of the power supply device in FIG. 3.

FIG. 4 gives the equivalent electric diagram for one phase of the asynchronous machine 30. In this Figure:

g represents slip,
$R_2$ represents stator resistance,
$jX_2$ represents stator leakage inductance,
$R_1$ represents rotor resistance,
$jX_1$ represents rotor leakage inductance,
$jX_m$ represents magnetisation inductance,
$R_m$ represents magnetic losses,
$I_m$ represents magnetisation current, $R_L$ represents the load i.e. the resistance 23,
$V_L$ represents the voltage at the terminals of the resistance $R_L$, and
C represents the capacitor 24.
Slip g is equal to:

$$g=(Nr/(60*p)-Fst)/Nr/(60*p)$$

where:
Nr is the speed of rotation of the rotary support 5, in revs per minute,
p is the number of pairs of poles, and
Fst is the frequency of the generated current.
The asynchronous machine 30 functions as follows.

When the switches 21 are open, no electric current is able to circulate in the electrical circuit 20 of the stator 8. The windings 22 do not therefore generate any magnetic field. Therefore no electric voltage is generated in the windings of the rotor 10 and no power is supplied to the resistances 23.

When the switches 21 are closed, an electric current is able to circulate in the electrical circuit 20 of the stator 8. The windings 22 are therefore able to generate a magnetic field. If the speed of rotation Nr of the rotary support 5 of the engine 1 is under good conditions in relation to the values of the capacitors 24, the asynchronous machine 30 is able to function, by means of the capacitors 24, as a self-excited asynchronous generator and can hence generate an electric voltage in the windings of the rotor 10, allowing power to be supplied to the resistances 23.

On closing of the switches 21, the phenomenon of self-priming is initiated by the residual flux of the asynchronous machine 30. In one embodiment, a device 25 to assist priming is connected to the electrical circuit 20. On closing of the switches 21, the priming assistance device 25 sends a current pulse into the electrical circuit 20, for example via a transformer, in order to generate a residual magnetic field and allow priming.

In other words, the asynchronous machine 30 is configured to function as a self-excited asynchronous generator, in which the roles of stator and rotor are reversed compared with the self-excited asynchronous generator cited in the introduction. This makes it possible to supply power to the resistances 23 carried by the rotary support 5 of the engine 1. No brush device or rotating transformer is necessary. In addition, the electric power consumed by the resistances 23 is fully taken from the rotation of the rotary support 5. It is not necessary to supply electric power to the stator 8 of the asynchronous machine 30 to generate electric power towards the rotor 10.

To allow said functioning as self-excited asynchronous generator, the capacity value of the capacitors 24 must be appropriately chosen in particular in relation to the characteristics of the asynchronous machine 30, the speed of rotation Nr of the rotary support 5 and the load i.e. the resistances 23. The determination of capacity value is known by the person skilled in the art and it is not necessary to give a detailed description thereof.

As explained previously, the engine 1 is an engine of non-ducted fan type having two counter-rotating rotary supports. At nominal power, this type of engine operates at substantially constant rotation speed. In addition, the resistances 23 form a substantially constant resistive load. The capacitors 24 may therefore be simple capacitors of constant capacity.

However, the invention is not limited to supplying power to a de-icing device in an engine of this type. The invention may generally concern apparatus of any type comprising a fixed part and a rotary support carrying an item of electrical equipment to be powered. Therefore the speed of rotation and the load value are not necessarily constant.

To allow functioning as a self-excited asynchronous generator, when the speed of rotation and/or load vary, each capacitor 24 can be replaced by a capacitor bank comprising several capacitors and switches allowing the capacity of the capacitor bank to be caused to vary. Also as a variant, the self-excitation reactive current can be supplied by an electric or electronic device.

As previously explained, the electronic command unit 12 receives measurement signals representing currents circulating in the electrical circuit 20. Knowing the currents circulating in the electrical circuit 20, the electronic command unit 12 can estimate the current circulating in the resistances 23 and thereby facilitate the detection of a fault in the power supply device assembly. The electronic command unit 12 is also able to receive other signals particularly representing the rotation speed Nr, temperature . . . enabling it to verify that the functioning of the machine 30 is nominal.

If the electronic command unit 12 estimates, as a function of stator currents, that the currents in the resistances 23 are too strong, for example on account of a fault of short circuit type, it can command opening of the switches 21 to prevent degradation of the blades 14.

It can also be ascertained that the commanding and monitoring of the asynchronous machine 30 can be ensured without any switch, sensor or other electronic element at the rotary support 5 of the engine 1. This makes it possible to avoid constraints related to high temperature (at times higher than 200° C.) which may prevail at the rotary support 5, and mechanical constraints related to centrifugal acceleration.

However, even if the electronic command unit 12 does not detect a fault or does not command opening of the switches 21, the blades 14 are protected against overcurrent. A fault of short circuit type causes a variation in the value of the resistances 23. In this case, the capacitors 24 are no longer adapted for functioning as a self-excited asynchronous generator and a deactivation phenomenon occurs, leading to stoppage of the generation of electric power.

In addition, as previously mentioned, according to one variant the electronic command unit 12 can be powered by a device 17 capable of taking power from the stator 8 of the asynchronous machine 30. The device 17 is illustrated in FIG. 3. To tap this power the device 17 comprises resistances 15 in the line of each phase of the electrical circuit 20, and a device 16 to process the voltages taken on the resistances 15. As soon as the asynchronous machine 30 is primed, the current circulating in each phase of the circuit 20 causes a voltage drop on the resistance 15 of the corresponding phase and the processing device 16 allows the use of these voltage drops to power the electronic command unit 12. According to one variant, the resistances 15 can optionally be replaced by transformers.

Figure 5:
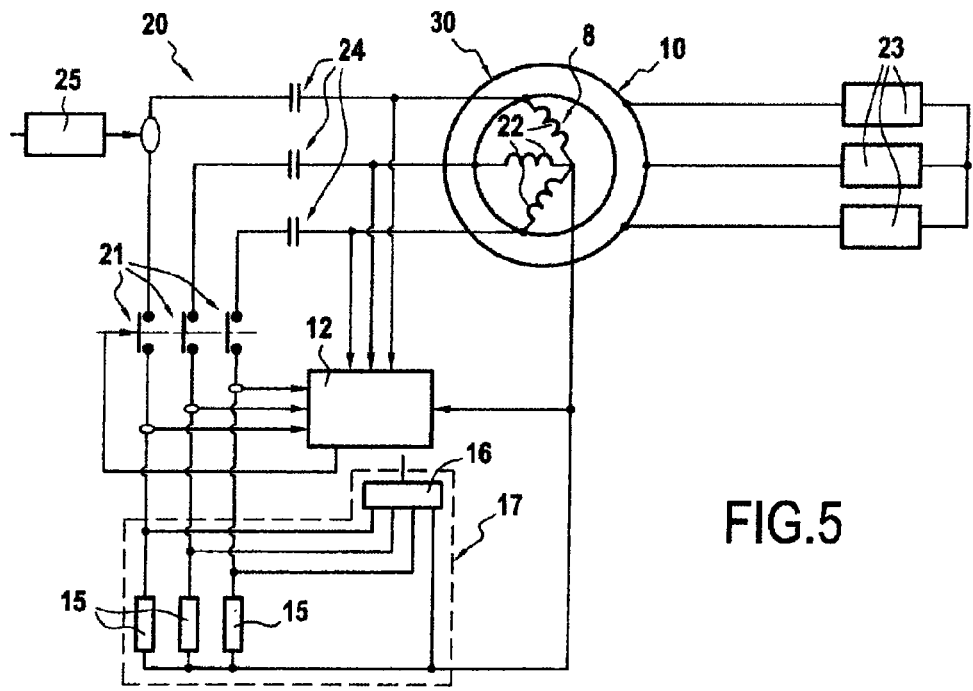
FIGS. 5 and 6 are similar Figures to FIGS. 3 and 4 respectively, showing a variant of embodiment.
Figure 6:
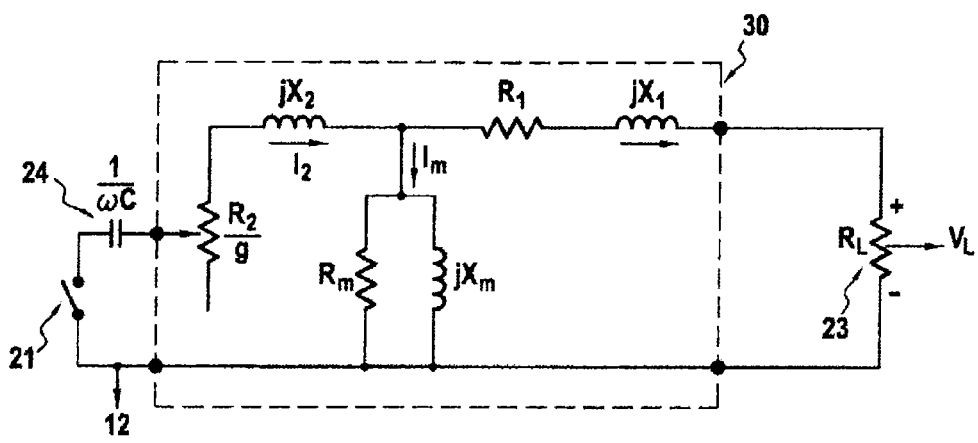

FIGS. 5 and 6 are similar to FIGS. 3 and 4, illustrating a variant of embodiment. Identical or similar elements to those in FIGS. 3 and 4 carry the same reference numbers and will not be further described in detail.

It can be seen that in this variant of embodiment, the capacitors 24 are integrated in series in the electrical circuit 20 of the stator 8. The capacitors 24 may therefore be positioned at a distance away from the rotary support 5 of the engine 1, which also allows the avoiding of constraints related to high temperature (at times higher than 200° C.) which may prevail at the rotary support 5, and of mechanical constraints related to centrifugal acceleration.

FIG. 2 illustrates an example of the positioning of the stators 8 and 9 and rotors 10 and 11 in the engine 1. Other positions can be envisaged as a variant. In addition, only one of the rotary supports 4 and 5 may be equipped with an asynchronous machine. Also, several asynchronous machines can be provided for one of the rotary supports 4 and 5. For example if the de-icing device comprises several groups of resistances, each group to be successively powered as per a predefined cycle, the engine 1 may comprise one asynchronous machine per group.

Finally, a description has been given of the power supplied to the de-icing device under nominal operation, when the main shaft 3 and the rotary supports 4 and 5 of the engine 1 are driven in rotation at nominal speed. In one variant of embodiment, it is also possible to power the de-icing device when rotation has stopped or the rotation speed is slow using an asynchronous machine 30 in transformer mode. For this purpose, the engine 1 comprises an alternating voltage source which can be connected to the electrical circuit 20.

The invention claimed is:

1. An apparatus comprising:
    a fixed part;
    a first rotary support configured to be driven in rotation in a first rotating direction relative to the fixed part, the first rotary support carrying a first set of blades;
    a second rotary support configured to be driven in rotation in a second rotating direction relative to the fixed part, the second rotating direction being opposite to the first rotating direction, the second rotary support carrying a second set of blades;
    a first electrical equipment carried by the first rotary support;
    a second electrical equipment carried by the second rotary support;
    a first self-excited asynchronous machine configured to supply electrical energy to the first electrical equipment and comprising:
        a first stator fixed to the fixed part and a first rotor carried by the first rotary support, and a first excitation device, the first stator being not electrically connected to a dedicated power source;
        a first electrical circuit including a first switch configured to switch between an open state in which the first electrical circuit is open, and a closed state in which the first electrical circuit is closed; and
        a first winding connected to the first electrical equipment,
        wherein the first electrical circuit is integrated into the first stator of the first self-excited asynchronous machine, and
        wherein the first winding forms part of the first rotor of the first self-excited asynchronous machine; and
    a second self-excited asynchronous machine configured to supply electrical energy to the second electrical equipment and comprising:
        a second stator fixed to the fixed part and a second rotor carried by the second rotary support, and a second excitation device, the second stator being not electrically connected to a dedicated power source;
        a second electrical circuit including a second switch configured to switch between an open state in which the second electrical circuit is open, and a closed state in which the second electrical circuit is closed; and
        a second winding connected to the second electrical equipment,
        wherein the second electrical circuit is integrated into the second stator of the second self-excited asynchronous machine, and
        wherein the second winding forms part of the second rotor of the second self-excited asynchronous machine,
    wherein the first rotor of the first self-excited asynchronous machine is disposed radially outward of the second rotor of the second self-excited asynchronous machine.

2. The apparatus according to claim 1, wherein the first excitation device is connected to the first electrical circuit of the first stator.

3. The apparatus according to claim 1, further comprising an electronic command unit configured to command the switching of the first switch and to estimate a current circulating in the first electrical equipment in relation to a measurement signal representing a current circulating in the first electrical circuit.

4. The apparatus according to claim 3, wherein the electronic command unit is powered by a device configured to take power from the first stator of the first self-excited asynchronous machine.

5. The apparatus according to claim 1, further comprising a device to assist priming configured to circulate a current in the first electrical circuit when the first switch is in the closed state.

6. An aircraft engine comprising:
    an apparatus according to claim 1;
    a main shaft; and
    a power gear box configured to convert rotation of the main shaft to rotation of the first rotary support in the first rotating direction and to rotation of the second rotary support in the second rotating direction.

7. The aircraft engine according to claim 6, wherein the first electrical equipment includes a de-icing device including resistances integrated in the first set of blades.

8. The aircraft engine according to claim 6, wherein the second electrical equipment includes a de-icing device including resistances integrated in the second set of blades.

9. The apparatus according to claim 1, wherein the apparatus is free of a brush device and is free of a transformer.

10. The apparatus according to claim 1, wherein the first excitation device includes at least one capacitor connected to the first electrical circuit of the first stator or to the first winding of the first rotor.

11. The apparatus according to claim 10, wherein said at least one capacitor comprises a capacitor bank of variable capacity.

12. The apparatus according to claim 1, wherein the second excitation device is connected to the second electrical circuit of the second stator.

13. The apparatus according to claim 1, further comprising an electronic command unit configured to command the switching of the second switch and to estimate a current circulating in the second electrical equipment in relation to a measurement signal representing a current circulating in the second electrical circuit.

14. The apparatus according to claim 13, wherein the electronic command unit is powered by a device configured to take power from the second stator of the second self-excited asynchronous machine.

15. The apparatus according to claim 1, further comprising a device to assist priming configured to circulate a current in the second electrical circuit when the second switch is in the closed state.

16. The apparatus according to claim 1, wherein the second excitation device includes at least one capacitor connected to the second electrical circuit of the second stator or to the second winding of the second rotor.

17. A method for supplying power to first and second electrical equipments of an apparatus including a fixed part; a rotary support configured to be driven in rotation in a first rotating direction relative to the fixed part, the first rotary support carrying a first set of blades; a second rotary support configured to be driven in rotation in a second rotating direction relative to the fixed part, the second rotating direction being opposite to the first rotating direction, the second rotary support carrying a second set of blades, the first electrical equipment being carried by the first rotary support and the second electrical equipment being carried by the second rotary support, and a first self-excited asynchronous machine configured to supply electrical energy to the first electrical equipment and a second self-excited asynchronous machine configured to supply electrical energy to the second electrical equipment, the first self-excited asynchronous machine comprising a first stator fixed to the fixed part and a first rotor carried by the first rotary support, and a first excitation device, the first stator being not electrically connected to a dedicated power source;

the first stator comprising a first winding and a first electrical circuit including a first switch configured to switch between an open position in which the first electrical circuit is open and no magnetic field is generated in the first winding, and a closed position in which the first electrical circuit is closed and the first winding is able to generate a magnetic field;

the first rotor comprising a second winding connected to the first electrical equipment;

the second self-excited asynchronous machine comprising a second stator fixed to the fixed part and a second rotor carried by the second rotary support, and a second excitation device, the second stator being not electrically connected to a dedicated power source, the second stator comprising a third winding and a second electrical circuit including a second switch configured to switch between an open position in which the second electrical circuit is open and no magnetic field is generated in the third winding, and a closed position in which the second electrical circuit is closed and the second winding is able to generate a magnetic field;

the second rotor comprising a fourth winding connected to the second electrical equipment;

the method comprising:

causing the first self-excited asynchronous machine to function as a self-excited asynchronous generator for supplying electrical energy to the first electrical equipment carried by the first rotary support and causing the second self-excited asynchronous machine to function as a self-excited asynchronous generator for supplying electrical energy to the second electrical equipment carried by the second rotary support, wherein the first rotor of the first self-excited asynchronous machine is disposed radially outward of the second rotor of the second self-excited asynchronous machine.

* * * * *